March 24, 1931.  J. M. MURRAY  1,798,123
PUMP PISTON
Filed July 22, 1929
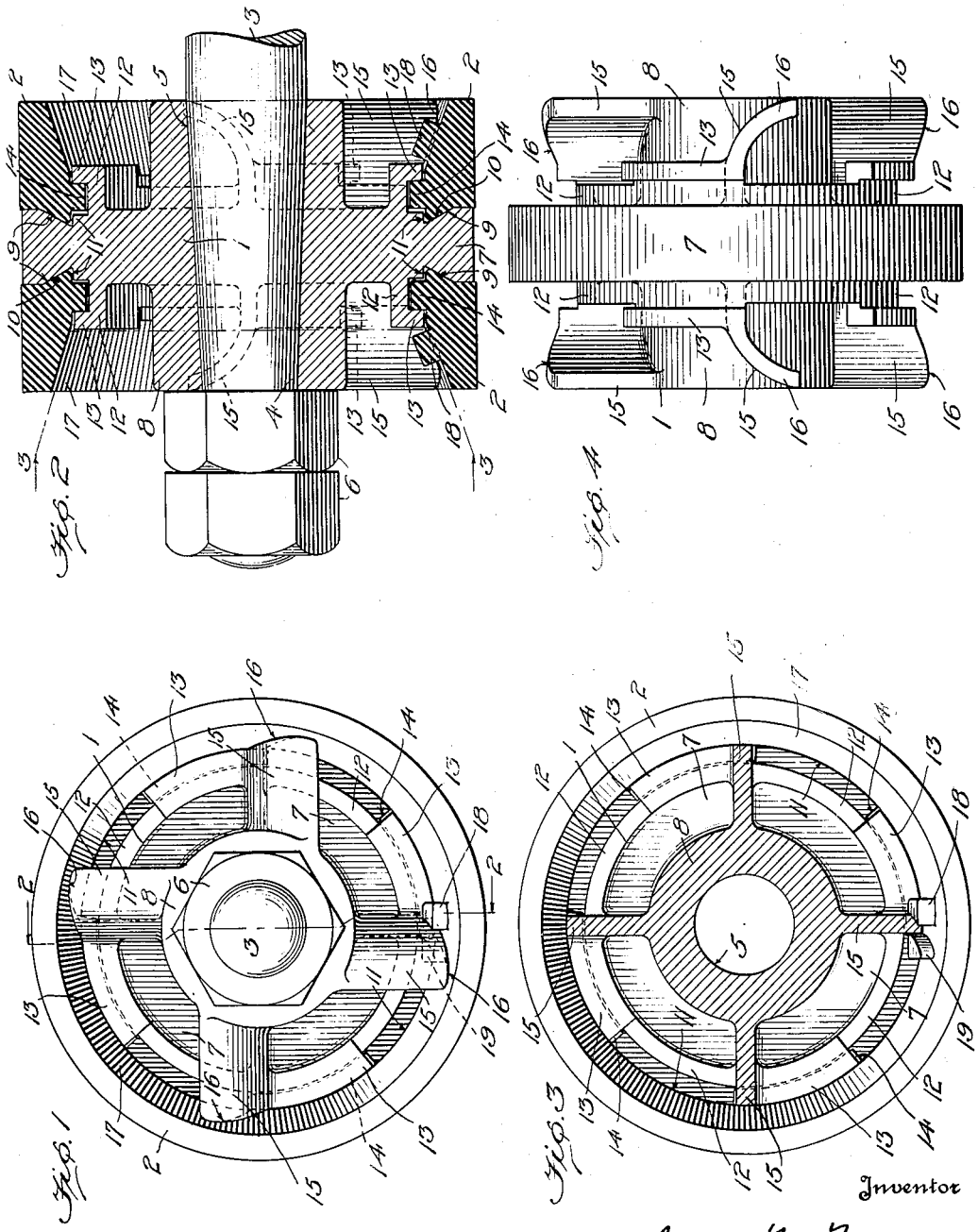
Inventor
James M. Murray
By Ritter & Ritter
his Attorneys Patented Mar. 24, 1931

1,798,123

UNITED STATES PATENT OFFICE

JAMES M. MURRAY, OF CLEVELAND, OKLAHOMA

PUMP PISTON

Application filed July 22, 1929. Serial No. 380,153.

This invention relates to pistons for pumps, and especially to pistons of slush pumps that are designed to operate upon a fluid containing abrasive materials such as are present in the water circulated through deep wells sunk by the rotary drilling process.

The principal object of the invention is to provide a piston capable of withstanding the hard usage in a slush pump, which is simple in construction, efficiently operates without imposing undue friction on the cylinder walls, and in which not only is all work necessary to the replacement of the resilient piston packings capable of performance while the piston is removed from the cylinder, but the packings are associated with the piston body in such manner that the piston balance is preserved and the strains which are in a great measure responsible for piston rod breakage are largely eliminated.

The primary feature of the invention consists in providing the piston body with an integral collar which intervenes between endless resilient packing rings whose pressure against the walls of the cylinder is governed by the fluid pressure to which they are subjected in the pumping operation.

A further feature of the invention consists in providing the piston body and packing rings with interlocking portions serving to prevent disassociation of the rings from the piston body when the device is in service.

A still further feature of the invention consists in so forming the piston as to enable it to impart a rotating motion to the fluid pumped, thereby preventing any grit, sand or other abrasive substance which may find its way between the piston and the cylinder walls from scoring the walls by moving repeatedly along the same path.

There are other features of the invention relating to advantageous forms of parts and details of construction, all as will hereinafter appear and be pointed out in the claims.

In the drawings showing a preferred embodiment of the invention:

Figure 1 is a plan view of a piston constructed in accordance with the invention, a portion of a piston rod upon which it is mounted being also shown.

Figure 2 is a sectional view on the line 2—2, Fig. 1, the piston rod being in elevation.

Figure 3 is a view partly in plan and partly in section on the line 3—3, Fig. 2.

Figure 4 is a side elevation of the piston body.

In the drawings, 1 indicates the piston body; 2, 2, are the resilient packing rings mounted thereon: and, 3 is the piston rod by which the piston is actuated. While the piston rod is shown as having a tapering end 4 entering a correspondingly tapered bore 5 of the piston body and secured in assembled relation by means of nuts 6, it is to be understood that the particular mode of connecting the piston and rod is not material.

The piston body 1 is a unitary member formed with an integral collar or flange 7, of circular form, which projects radially outward from the central perforated hub portion 8 into which the piston rod fits. This collar, which is interposed between the resilient packings 2, is provided on opposite sides adjacent its periphery with inclined or conically beveled surfaces 9 which co-operate with the correspondingly inclined surfaces 10 with which the packing rings 2 are respectively provided. The beveled faces 9 of the central collar converge inwardly toward the center of the piston, and adjacent the inner end of each the flange or collar 7 is formed with an annular shoulder 11 serving to limit inward movement of the packing ring with which it co-operates. During pumping operation the beveled or inclined surfaces 9 and 10 co-operate to form a seal, notwithstanding that the packings 2 may and preferably do fit freely on the piston.

Inwardly of the beveled faces 9 the central collar of the piston is formed on opposite sides with cylindrical flanges 12, each of which is integrally provided with spaced segmental lugs 13, preferable four in number and equally spaced, that project outward radially. The segmental lugs 13 are designed to overlap a corresponding number of curved lugs 14 with which the interior surface of each of the packing rings is provided. When the parts are in assembled relation, the lugs 14 of the packings 2 fit loosely into the spaces between the overlying segmental lugs 13 and the central part of the piston collar 7, thus permitting the packing to expand under the pressure of the fluid during the pumping stroke of the piston and to contract on the suction stroke so as to eliminate friction against the walls of the cylinder.

Extending radially outward from the hub 8 on opposite sides thereof and forming an integral part of the piston body, are a plurality of ribs or flanges 15 which serve to hold the cupped packings fairly close to the cylinder walls during the return or suction stroke of the piston corresponding to a particular packing, the outer ends of the ribs or flanges being flared, as indicated at 16, to conform to the adjacent cupped portion 17. The portions 15 of the piston body, instead of being plane surfaces, are preferably curved or inclined vanes, as such a construction imparts to the fluid being pumped a slight rotating motion at each end of the stroke, which has the effect of reducing the possibility of scoring the cylinder walls by preventing any grit, sand or abrasive particles the piston may pick up from passing twice in the same position. The vanes 15 are preferably positioned so that they respectively slope away from one end of each of the segmental lugs 13 of the piston body, and the vanes on one side of the central collar 7 are curved in the opposite direction to those upon the other side of the collar, thereby causing the direction of rotation of the fluid to be the same for both strokes of the piston.

The packings 2, which are preferably of rubber, are cupped or coned on the inside at their leading ends, as indicated at 17, to permit the fluid to flow under them and exert thereon a pressure effecting their expansion against the cylinder walls. During the suction stroke they are prevented from sliding axially of the piston body by means of the segmental lugs 13 which overlap the corresponding lugs 14 of the packings. To insure that the lugs 14 of the packing shall remain in proper assembled relation to the overlying segmental lugs 13 of the piston body, each of the packings is provided on the inside with spaced lugs 18 and 19, respectively, which engage and receive between them one of the radial flanges or vanes 15, such engagement being preferably closely adjacent the neighboring segmental lug 13. After the piston is placed inside the pump cylinder these two lugs prevent the packing from turning on the piston body.

The assembly of the packing rings 2 upon the piston body is very simply effected. By bringing each packing ring into the general form of a square it may be readily passed over the outer ends of the four radial flanges or vanes 15. The packing is then rotated with respect to the piston body so as to cause its lugs 14 to pass under the corresponding segmental lugs 13, the packing being stretched sufficiently to enable the vane 15, which co-operates with the lugs 18 and 19, to enter the space between said last named lugs.

When the piston moves in one direction, the pressure of the fluid on one of the packing rings 2 causes that packing ring to expand against the cylinder walls and to seal tightly against the beveled or inclined face 9 of the central collar 7 of the piston body. At the same time the other packing ring 2, being under the influence of suction, is relieved from pressure against the cylinder walls, thus eliminating friction. These actions of the packing rings occur alternately, depending upon the direction of motion of the piston.

A piston constructed in accordance with the invention eliminates friction between the metal cylinder walls and the metal piston body because the packings expand uniformly circumferentially and prevent the piston body from having contact with the cylinder walls. Not only does the invention provide a light and easily assembled device eliminating the commonly used screws and follower plates, but it provides a piston which, by having the strains applied thereto at the center, causes the piston to balance well in the cylinder and on the piston rod, thereby greatly reducing rod breakage; and not the least of the advantages of the invention is that the construction permits all work necessary to replace the packings to be performed while the piston is removed from the cylinder.

I claim:

1. A pump piston involving a body member provided between its ends with a laterally projecting circumferential collar, a plurality of resilient endless packing rings disposed upon opposite sides of said collar, said rings and said collar having co-operating sealing faces extending at an oblique angle to the axis of said piston and adapted to be forced together by the pressure of the liquid on which the piston operates, and means integrally connected to said collar for maintaining said rings in assembled relation to said collar, said means permitting said rings to be positioned in contact with said collar and to be rotated to assembled position.

2. A pump piston involving a body member provided between its ends with a laterally extending circumferential collar integrally united thereto and formed on opposite sides with beveled faces, a plurality of packing rings, said collar being interposed between said packing rings and each of the latter being provided with a beveled face for co-operating with one of said beveled faces of the collar, and means for retaining said rings is assembled relation to said collar, said rings being rotatable in contact with said collar into assembled relation with said means.

3. A pump piston involving a body member provided between its ends with a laterally projecting collar and having integrally attached segmental lugs disposed on opposite sides of the collar and spaced therefrom, said collar being formed outwardly of said lugs with beveled faces and shoulders adjacent the inner ends of said faces, and a plurality of resilient packing rings disposed on opposite sides of the collar, said rings being provided with beveled faces and shoulders for respectively engaging the said beveled faces and shoulders of the collar and said rings also being provided with inwardly projecting portions adapted to extend between the collar and said lugs of the body member adjacent thereto.

4. A pump piston involving a body member, a packing ring, means for retaining said packing ring in assembled position, and a plurality of inclined vanes on the body member for inducing rotation of the fluid upon which the piston operates.

5. A pump piston involving a body member provided between its ends with a laterally projecting collar and having on opposite sides of said collar a plurality of inclined vanes for inducing rotation of the fluid upon which the piston operates, a plurality of resilient packing rings respectively encircling said vanes on opposite sides of said collar, and means for retaining said rings in assembled relation to the body member.

6. A pump piston involving a body member provided between its ends with a laterally projecting circumferential collar, a plurality of resilient packing rings disposed upon opposite sides of said collar and engaging the latter, means for retaining said rings in assembled relation to the body member, and a plurality of inclined vanes disposed on opposite sides of the collar and respectively encircled by said rings, the vanes on opposite sides of said collar being reversely inclined to thereby cause the fluid operated on by the piston to rotate in the same direction.

7. A pump piston involving a plurality of resilient packing rings and an integral body member comprising a central hub, a circumferential collar projecting radially from said hub intermediate of the ends of the latter, a plurality of spaced segmental lugs on opposite sides of the collar, and a plurality of curved vanes on opposite sides of the collar, each of said rings being interiorly cupped at its leading end and having a plurality of lugs for engaging said segmental lugs of the body member, and said collar and rings being provided with correspondingly beveled co-operating sealing faces.

8. A pump piston involving a body member provided between its ends with a laterally projecting circumferential collar, and a plurality of resilient endless packing rings disposed upon opposite sides of said collar and engaging the latter, said body member being provided on opposite sides of the collar with a plurality of spaced segmental lugs, and said rings being formed with inwardly projecting lugs extending between said collar and the segmental lugs of the body member, and each of said rings being also formed with a lug for engaging a portion of the piston body to retain said rings in assembled relation to the segmental lugs of the body member.

9. A pump piston involving a plurality of resilient packing rings and an integral body member formed with a central hub and having a collar projecting radially from said hub between the ends of the latter and having upon opposite sides of the collar a plurality of flanges extending outwardly from said hub, the said packing rings being disposed upon opposite sides of the collar and engaging the latter and being interiorly cupped at their respective leading ends, the outer ends of the said flanges being inclined to conform respectively to the cupped surfaces of the packing rings, and co-operating means formed upon said rings and the piston body for retaining the rings in assembled position.

10. A pump piston involving a body member provided between its ends with a laterally projecting circumferential collar integrally united thereto, a plurality of resilient endless packing rings disposed upon opposite sides of said collar, said rings and said collar having co-operating inclined sealing faces adapted to be forced together by the pressure of the liquid on which the piston operates, each of said rings being cupped at its leading end to permit the liquid operated upon to exert outward radial pressure upon said rings, and co-operating lugs on said piston body and rings respectively for maintaining said rings in assembled relation to said collar.

11. A pump piston involving an integral body member having a central hub and a collar projecting radially between the ends of the hub, a plurality of packing rings spaced radially outward from the hub and engaging opposite sides of said collar, means for retaining the rings in assembled position, and a plurality of flanges on opposite sides of the collar extending lengthwise of the piston and projecting outward from said hub for respectively cooperating with said packing rings to limit radially inward movement of the latter.

In testimony whereof I affix my signature.

JAMES M. MURRAY.